United States Patent
Fukaya et al.

(10) Patent No.: US 8,512,570 B2
(45) Date of Patent: Aug. 20, 2013

(54) WASTEWATER TREATMENT METHOD

(75) Inventors: Taro Fukaya, Higashikurume (JP); Shinji Murai, Sagamihara (JP); Shinetsu Fujieda, Kawasaki (JP); Hideyuki Tsuji, Yokohoma (JP); Akiko Suzuki, Tokyo (JP); Tatsuoki Kohno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/606,240

(22) Filed: Sep. 7, 2012

(65) Prior Publication Data

US 2012/0325731 A1   Dec. 27, 2012

Related U.S. Application Data

(63) Continuation of application No. PCT/JP2011/004813, filed on Aug. 30, 2011.

(30) Foreign Application Priority Data

Sep. 3, 2010   (JP) ................................. 2010-198264

(51) Int. Cl.
  *B01D 35/06* (2006.01)
  *B01D 37/02* (2006.01)
  *B03C 1/30* (2006.01)

(52) U.S. Cl.
  USPC ........... 210/695; 210/223; 210/661; 210/670; 210/777

(58) Field of Classification Search
  USPC ................. 210/223, 695, 777–779, 193, 222, 210/661, 670
  See application file for complete search history.

(56) References Cited

U.S. PATENT DOCUMENTS

| | | | |
|---|---|---|---|
| 3,803,033 A | | 4/1974 | Sutherland |
| 3,830,371 A | * | 8/1974 | Garcia ........................ 210/265 |
| 3,890,224 A | * | 6/1975 | Weiss et al. .................. 210/671 |
| 3,923,651 A | | 12/1975 | Weiss et al. |
| 4,118,778 A | * | 10/1978 | Strub ............................ 700/271 |
| 4,201,831 A | | 5/1980 | Slusarczuk et al. |
| 4,629,571 A | * | 12/1986 | Salem et al. .................. 210/668 |
| 5,900,146 A | * | 5/1999 | Ballard et al. ................ 210/222 |
| 6,830,679 B2 | * | 12/2004 | Tsuihiji et al. ................. 210/87 |
| 7,520,994 B2 | | 4/2009 | Dong et al. |
| 8,221,622 B2 | | 7/2012 | Fukaya et al. |
| 2001/0030160 A1 | * | 10/2001 | Wechsler et al. ............. 210/695 |
| 2002/0162797 A1 | * | 11/2002 | Johnson et al. .............. 210/660 |

FOREIGN PATENT DOCUMENTS

| | | |
|---|---|---|
| JP | 07-102238 | 4/1995 |
| JP | 09-327611 | 12/1997 |
| JP | 2009-268976 | 11/2009 |
| WO | WO 2008/008897 | 1/2008 |

OTHER PUBLICATIONS

International Search Report issued Nov. 30, 2011 in PCT/JP2011/004813 filed Aug. 30, 2011.

Written Opinion of the International Searching Authority mailed on Nov. 30, 2011.

International Preliminary Report on Patentability (IPRP) for PCT Application No. PCT/JP2011/004813, Date of Mailing: Mar. 14, 2013.

\* cited by examiner

*Primary Examiner* — David C Mellon
(74) *Attorney, Agent, or Firm* — Oblon, Spivak, McClelland, Maier & Neustadt, L.L.P.

(57) ABSTRACT

A wastewater treatment method in an embodiment includes: mixing primary aggregates made of magnetic substances and a dispersion medium to make a suspension; and passing the suspension through a filter to allow the primary aggregates to remain on the filter and to form a secondary aggregate made of an aggregate of the primary aggregates. Further, the wastewater treatment method in the embodiment includes; passing wastewater through the secondary aggregate to remove suspended solids and oil in the wastewater; dispersing the secondary aggregate in a dispersion medium to decompose the secondary aggregate into the primary aggregates and to wash the primary aggregates; and collecting the primary aggregates with magnetic separation.

8 Claims, No Drawings

WASTEWATER TREATMENT METHOD

CROSS-REFERENCE TO RELATED APPLICATION

This application is a continuation of prior International Application No. PCT/JP2011/004813, filed on Aug. 30, 2011 which is based upon and claims the benefit of priority from Japanese Patent Application No. 2010-198264, filed on Sep. 3, 2010; the entire contents of all of which are incorporated herein by reference.

FIELD

Embodiments described herein relate generally to a wastewater treatment method.

BACKGROUND

Recently, the effective utilization of water resources has been required due to the development of industry and increase in population. Thus, the reuse of waste liquid such as industrial wastewater is very important. In order to achieve the effective utilization and reuse, it is necessary to purify the waste liquid, namely to separate other substances from the waste liquid.

As a method of separating other substances from liquid, various methods have been known, and for example, membrane separation, centrifugal separation, active carbon adsorption, ozonation, aggregation, and further removal of suspended solids by a predetermined adsorbent, and so on have been exemplified. Such methods make it possible to remove chemical substances such as phosphorus and nitrogen contained in water, which greatly affect on the environment, and to remove oil, clay and so on dispersed in water.

Among them, the membrane separation is one of the most generally used methods, but has a problem that in the case of removing oil dispersed in water, the oil is likely to get caught in pores of a membrane so that the lifetime of the membrane is easily shortened. Thus, in many cases, the membrane separation is not appropriate for removing oil in water.

As a treatment method of such wastewater containing oil, there has been disclosed a method of treating hardly filterable waste liquid containing oil and so on with a filter auxiliary agent made of a magnetic substance, for example. Further, as a method of adsorbing oil in water, there has been cited a method of adsorbing oil with adsorbing polymers, for example, and thereafter removing the adsorbing polymers from water.

DETAILED DESCRIPTION

A wastewater treatment method in an embodiment includes: mixing primary aggregates made of magnetic substances and a dispersion medium to make a suspension; and passing the suspension through a filter to allow the primary aggregates to remain on the filter and to form a secondary aggregate made of an aggregate of the primary aggregates. Further, the wastewater treatment method in the embodiment includes; passing wastewater through the secondary aggregate to remove suspended solids and oil in the wastewater; dispersing the secondary aggregate in a dispersion medium to decompose the secondary aggregate into the primary aggregates and to wash the primary aggregates; and collecting the Hereinafter, an embodiment will be explained in detail.
(Primary Aggregate and Secondary Aggregate)

First, a primary aggregate and a secondary aggregate used in a wastewater treatment method in the embodiment will be explained.

An aggregate of a magnetic substance, which is the primary aggregate in this embodiment, is formed in a manner that magnetic substance core particles are bonded with a binder to be aggregated, or the magnetic substance core particles are partially melted to be self-bonded. In the case of using the binder, for example, the magnetic substance core particles and a binder component are mixed in a solution, and the thus obtained mixture thereof is sprayed and dried, thereby forming the above-described primary aggregates.

Incidentally, as for the primary aggregate, the magnetic substance core particles are bonded with the binder to be condensed, or the magnetic substance core particles are partially melted, so that the magnetic substance core particles are bonded and aggregated. Therefore, a plurality of pores opened on the surface of the primary aggregate are formed in the binders or between the adjacent magnetic substance core particles. Note that the adsorption and removal of oil in wastewater are performed through the above pores as will be explained below.

As the magnetic substance composed of the magnetic substance core particles, a substance exhibiting a ferromagnetic property in a room temperature region is desirable in order to facilitate the collection of the primary aggregates by the magnetic separation in the wastewater treatment method that will be explained below. However, the magnetic substance is not limited to the above substance in this embodiment, and ferromagnetic substances can be used in general, and for example, iron, alloy containing iron, magnetic iron ore, ilmenite, pyrrhotite, magnesia ferrite, cobalt ferrite, nickel ferrite, barium ferrite are exemplified.

A ferrite-based compound is excellent in stability in water, so that it can be preferably used in operation such that organic macromolecules are collected from waste liquid, as is in this embodiment. Particularly, magnetite ($Fe_3O_4$) as magnetic iron ore is not only inexpensive but also stable even in water as a magnetic substance and secure as an element, so that magnetite is likely to be used in a water treatment and thus is preferable.

Incidentally, the size of the magnetic substance core particle is not limited in particular, but a particle diameter such that an average pore diameter of the pores opened on the surface of the primary aggregate, which are formed in the primary aggregate, is within a range of 0.01 micrometer to 1 micrometer is preferable. For example, as described above, in the case where the magnetic substance core particles are aggregated with the binder, or the magnetic substance core particles are aggregated by the self-bonding, an average particle diameter of the magnetic substance core particles is set within a range of about 0.05 to 10 micrometer.

Further, when the pores formed in the primary aggregate have the average pore diameter of 0.01 micrometer to 1 micrometer as described above, it is possible to adsorb oil in wastewater more effectively and efficiently as will be explained below.

Here, the average particle diameter is measured by laser diffractometry. Concretely, the average particle diameter can be measured by a SALD-DS21-type measurement unit (trade name) manufactured by SHIMADZU CORPORATION or the like. Further, the average pore diameter can be measured by a shimadzu pore distribution measurement apparatus Autopore 9520 type (trade name) or the like.

The shape of the magnetic substance core particles is not limited in particular, and can be set to an arbitrary shape such as a spherical shape, a polyhedron, or an indeterminate shape.

The desirable particle diameter and shape of the magnetic substance core particles may be appropriately selected in consideration of the manufacturing cost or the like, and particularly a spherical structure, or a polyhedral structure with round corners is preferable. If the magnetic substance core particles have acute angles, in the case where the primary aggregate is formed with the binder, for example, the acute angles damage the above binder and thus it sometimes becomes difficult to maintain the targeted shape of the primary aggregate.

Note that normal plating such as Cu plating or Ni plating can be performed on the magnetic substance core particles according to need. Further, a surface treatment can also be performed on the magnetic substance core particles in terms of the corrosion protection of the surfaces.

When the primary aggregate is formed with the binder, as the binder, a styrene resin, a hydrogenated styrene resin, a butadiene resin, an isoprene resin, an acrylonitrile resin, a cycloolefin resin, an alkylacrylate resin, a phenolic resin, an alkylmethaacrylate resin, or the like is preferably used. These resins are excellent not only in liphophilicity but also in oil resistance. Thus, the primary aggregate containing such a binder (resin) can adsorb and remove oil in wastewater more effectively and efficiently, and has resistance against the wastewater.

Further, from the reason similar to that described above, the binder can be made of a condensate of a coupling agent. In the above case, the surfaces of the magnetic substance core particles are treated with the coupling agent.

The treatment may also be either a dry method or a wet method. As the coupling agent, a silane coupling agent, namely alkylsilane such as methyltrimethoxysilane, ethyltrimethoxysilane, hexyltrimethoxysilane, dodecatrimethoxysilane, octadecyltrimethoxysilane, or ethyltriethoxysilane, aromatic silane such as phenyltrimethoxysilane or naphthalenetrimethoxysilane, epoxysilane such as gamma-glycidoxypropyltrimethoxysilane, gamma-glycidoxypropyl-methyldiethoxysilane, or beta-(3,4-epoxycyclohexyl)ethyltrimethoxysilane, vinylsilane such as vinyltriethoxysilane, vinyltrimethoxysilane, or gamma-methacryloxymethoxysilane, aminosilane such as gamma-aminopropyltriethoxysilane, gamma-aminopropyltrimethoxysilane, or N-phenyl-gamma-aminopropyltrimethoxysilane, mercaptosilane such as gamma-mercaptopropyltrimethoxysilane, or the like can be cited. Besides, a coupling agent such as titanate, Alumichelate, or zircoaluminate can also be used.

In the method of producing the primary aggregates by melting the magnetic substance core particles, for example, a raw material of ferrite is temporarily aggregated with an organic binder, and then is heated to a high temperature, so that ferrite is synthesized, and the primary aggregates can be obtained by utilizing the partial melt of ferrite. As ferrite as above, for example, Cu—Zn based ferrite, Li-MG-Ca based ferrite, Mn—Mg—Sr based ferrite, or the like is cited.

On the other hand, the secondary aggregate in this embodiment is formed in a manner that the above-described primary aggregates are tightly arranged and stacked in the process of the wastewater treatment method that will be described below, and is not formed in a manner that the primary aggregates are physically and chemically bonded in particular. Concretely, in the case where the primary aggregate is compared to a grain of sand or a stone, the secondary aggregate is in such a state that grains of sand or stones are filled into a predetermined container, tightly arranged in a lateral direction and stacked in a longitudinal direction one another.

Thus, the secondary aggregate can maintain the aggregates only when predetermined external force acts on the secondary aggregate, and differs from the primary aggregate formed in a manner that the magnetic substance core particles aggregate for themselves with the binder or the like even though such external force does not act on the magnetic substance core particles, in terms of the formation.

(Wastewater Treatment Method)

Next, the wastewater treatment method in the embodiment will be explained. Incidentally, as for the wastewater treatment method in the embodiment, there is presented two wastewater treatment methods exist. In this point of view, the two wastewater treatment methods will be explained respectively below.

<First Wastewater Treatment Method>

The first wastewater treatment method is called a precoat method, and is effective in the case where the concentration of suspended solids (SS) and/or the concentration of oil in wastewater are/is low as will be explained below in particular.

First, primary aggregates made of magnetic substances and a dispersion medium are mixed to make a suspension. The primary aggregates can be formed as described above. Water is mainly used as the dispersion medium, but other dispersion mediums can be used appropriately. The concentration of the primary aggregates in the suspension is adjusted to, for example, 10000 to 200000 mg/L or so but the concentration is not taken into consideration only if a precoat layer, namely a secondary aggregate is formed by the following operation.

Next, the suspension is passed through a filter, so that the primary aggregates in the suspension are filtered and remain on the filter so as to form the secondary aggregate, namely the precoat layer. Incidentally, the passing of the suspension is performed under a pressurized condition.

Further, since the secondary aggregate is formed and maintained by the action of external force as described above, the above-described filtering is set such that for example, the filter is disposed so as to close the opening of a predetermined container. In this case, the primary aggregates remain on the filter disposed as above, arranged and stacked. In this case, the secondary aggregate is formed and maintained by the external force from a wall surface of the container and the downward force (gravity) ascribable to the weight of the primary aggregates positioned on the filter.

Incidentally, although the thickness of the secondary aggregate, namely the thickness of the precoat layer changes according to the concentration of liquid to be treated, it is approximately within a range of about 1 to 100 mm.

Next, the wastewater is passed through the secondary aggregate (precoat layer) formed as described so as to remove the suspended solids (SS) and oil in the wastewater are removed. The passing of the wastewater is mainly performed under a pressurized condition.

At this time, the suspended solids (SS) are adsorbed on the secondary aggregate (precoat layer), concretely on the surfaces of the primary aggregates composing the secondary aggregate and removed. On the other hand, the oil is adsorbed into pores in the primary aggregates composing the secondary aggregate by the following breakdown of emulsion and removed. More specifically, the oil is adsorbed and removed by the operation and effect that will be explained below.

In the case where the wastewater is passed through the secondary aggregate, the wastewater flows through either gaps formed between the adjacent ones of the primary aggregates composing the secondary aggregate or pores formed in the respective primary aggregates composing the secondary aggregate. The former gaps are sufficiently larger than the latter pores, so that the wastewater generally flows through the gaps formed between the adjacent ones of the primary aggregates, which generally causes the pressure loss to be small. Supposed that a surface active agent and oil coexist in water to make an emulsion. When the oil dispersed in the water in a state of emulsion passes through the gaps, the emulsion is deformed by the stream of water and an amount of the surface active agent to water/oil interfaces runs shorts, and the emulsion is broken temporarily. At this time, the oil is adsorbed into the pores in the primary aggregates and accumulated in the primary aggregates, so that the oil is removed.

Incidentally, when the gaps of the primary aggregates have an average pore diameter of 0.05 micrometer to 10 micrometer, the above-described deformation and breakdown of the emulsion are promoted, and thus the adsorption of the oil into the pores in the primary aggregates progresses. When the average pore diameter is larger than 10 micrometer, the degree of the above-described deformation and breakdown of the emulsion is reduced, and thus an amount of the oil adsorbed into the pores of the primary aggregates is reduced. On the other hand, when the average pore diameter is smaller than 0.05 micrometer, the speed of the passing of the wastewater is decreased and the oil is likely to get caught in the pores. In this case, the frequency in maintenance of the primary aggregates is increased, resulting in the lack in practicality of the average pore diameter. Further, when the pores formed in the primary aggregates have the average pore diameter of 0.01 micrometer to 1 micrometer, the adsorption of the oil of the emulsion broken by the gaps of the primary aggregates into the pores in the primary aggregates is promoted to remove the oil in the gaps of the primary aggregates and to enhance the speed of the passing of the waste water.

Further, in the case where the oil is not emulsified but is suspended in the wastewater, when the wastewater is passed through the secondary aggregate, the oil is partially adsorbed on the surfaces of the primary aggregates composing the secondary aggregate and thus adsorbed into the gaps of the primary aggregates as it is in the same manner as the suspended solids (SS).

After the suspended solids (SS) and oil in the wastewater are removed as described above, the secondary aggregate is dispersed in a dispersion medium so as to be decomposed into the primary aggregates, and the thus obtained primary aggregates are washed. The washing for the primary aggregates may be performed in the same container having the filter disposed therein, or may also be performed in another container. When the washing is performed in another container, the secondary aggregate is decomposed into the primary aggregates by means of backwashing or the like, and the thus obtained primary aggregates are carried to another container. Water is used for the washing, but a surface active agent or an organic solvent may be also used for washing.

Next, the primary aggregates after the washing are collected with magnetic separation. Any method of the magnetic separation may be used in particular, but there are cited a method where a permanent magnet or an electromagnet is put in the container to collect the primary aggregates, a method where the primary aggregates are collected with a wire mesh magnetized by a magnet or the like and a method where a magnetic field is affected so as to collect the primary aggregates.

Incidentally, in the first wastewater treatment method, the secondary aggregate (precoat layer) is formed on the filter in advance and the wastewater is passed through the secondary aggregate, so that an amount of the suspended solids (SS) to be adsorbed on the surfaces of the primary aggregates is increased with a treatment time. As a result, the gaps of the primary aggregates are embedded by the suspended solids (SS) adsorbed excessively in particular, so that the degree of the deformation and breakdown of the emulsion by the gaps is reduced to deteriorate the removal efficiency of the oil. Consequently, as described above, the first wastewater treatment method is effective in the case where the concentration of suspended solids (SS) and/or the concentration of oil in the wastewater are/is low.

<Second Wastewater Treatment Method>

The second wastewater treatment method is called a body feed method, and is effective in the case where the concentration of suspended solids (SS) in wastewater is high as will be explained below.

Also in the present method, the primary aggregates made of magnetic substances and the dispersion medium are first mixed to make the suspension. In this case, however, the wastewater is used as the dispersion medium. That is, in the present method, the primary aggregates are directly put in the wastewater to make the suspension with the wastewater. The concentration of the primary aggregates in the suspension is adjusted to, for example, about 10000 to 200000 mg/L but the concentration is not taken into consideration only if a secondary aggregate is formed by the following operation.

Next, the suspension (wastewater) is passed through a filter, and then the primary aggregates in the suspension (wastewater) are filtered and remain on the filter, thereby forming the secondary aggregate as the aggregate of the primary aggregates. Incidentally, the passing process is performed under a pressurized condition.

Further, since the secondary aggregate is formed and maintained by the action of external force as described above, the filtering is set such that for example, the filter is disposed so as to close the opening of a predetermined container, so that the primary aggregates remain on the filter disposed as above, arranged and stacked. In this case, the above-described secondary aggregate is formed and maintained by external force from a wall surface of the container and the downward force (gravity) ascribable to the weight of the primary aggregates positioned on the filter.

Next, the wastewater (suspension) is passed through the secondary aggregate formed as described above and then suspended solids (SS) and oil being a component to be removed in the wastewater (suspension) are removed. The passing through is mainly performed under application of pressure.

Incidentally, as described above, the suspended solids (SS) are adsorbed on the secondary aggregate, concretely on the surfaces of the primary aggregates composing the secondary aggregate to thereby be removed. On the other hand, the oil is adsorbed into gaps formed between the adjacent ones of the primary aggregates composing the secondary aggregate by the deformation and breakdown of the emulsion to thereby be removed. In the present method, however, since the primary aggregates are put in the wastewater in advance, the suspended solids (SS) are adsorbed on the surfaces of the primary aggregates at a certain percentage in this time. Further, the oil that is not emulsified is also adsorbed on the surfaces of the primary aggregates and into the gaps formed between the adjacent ones of the primary aggregates when the primary aggregates are put in the wastewater in the same manner as described above.

Similarly to the first method, when the gaps formed between the adjacent ones of the primary aggregates have an average pore diameter of 0.05 micrometer to 10 micrometer, the above-described deformation and breakdown of the emulsion are promoted, so that the adsorption of the oil into the gaps of the primary aggregates is further promoted.

After the suspended solids (SS) and the oil in the wastewater are removed as described above, the secondary aggregate is dispersed in a dispersion medium so as to be decomposed into the primary aggregates. The primary aggregates are washed. The washing for the primary aggregates may be performed in the same container having the filter disposed therein, or may also be performed in another container. When the washing is performed in another container, the secondary aggregate is decomposed into the primary aggregates by means of backwashing or the like, and the thus obtained primary aggregates are carried to another container. Water is used for the washing, but a surface active agent or an organic solvent may be also used for the washing.

Next, the washed primary aggregates are collected with magnetic separation. Any method of the magnetic separation may be used in particular, but there are cited a method where a permanent magnet or an electromagnet is put in the container to collect the primary aggregates, a method where the primary aggregates are collected with a wire mesh magnetized by a magnet or the like and a method where a magnetic field is affected so as to collect the primary aggregates.

Incidentally, in the second wastewater treatment method, since the primary aggregates composing the secondary aggregate are contained in the wastewater, namely in the suspension made with the wastewater, the primary aggregates are always supplied into (the wastewater (suspension) containing) the suspended solids (SS) and oil to be removed.

Consequently, also in the case where a large amount of the suspended solids (SS) are contained in the wastewater (suspension) in particular, since the supply of the suspended solids (SS) and the supply of the primary aggregates are performed simultaneously, there is no case where the gaps among the primary aggregates are embedded by the suspended solids (SS) adsorbed excessively, which is different from the first wastewater treatment method. Thus, it is possible to suppress the deterioration of the removal efficiency of oil without reducing the degree of the deformation and breakdown of the emulsion by the gaps. As a result, as described above, the second wastewater treatment method is effective in the case where the concentration of suspended solids (SS) in the wastewater is high.

Incidentally, in the present method, since the primary aggregates are supplied into (the wastewater (suspension) containing) the suspended solids (SS) and oil to be removed, the formation of the secondary aggregate and the removal of the suspended solids (SS) and oil through the passing of the wastewater are performed simultaneously.

EXAMPLES

Production of Primary Aggregates Containing Magnetic Substances (Primary Aggregate 1)

138 parts by weight of polymethylmethacrylate was dissolved in 2400 ml of acetone to make a solution, and 1500 parts by weight of magnetite particles having an average particle diameter of 2000 nm were dissolved in the solution. The thus obtained solution was sprayed by a mini spray dryer (manufactured by SHIBATA SCIENTIFIC TECHNOLOGY LTD., B-290 type), so that primary aggregates having an average secondary particle diameter of 60 micrometer, which contain magnetic substances aggregated spherically, were produced.

(Primary Aggregate 2)

Primary aggregates were produced similarly to the method of producing the primary aggregates 1 except that magnetic substances having an average particle diameter of 200 nm were used. The average particle diameter of the aggregates was 10 micrometer.

(Primary Aggregate 3)

Primary aggregates were produced similarly to the method of producing the primary aggregates 1 except that magnetic substances having an average particle diameter of 10 micrometer were used. The average particle diameter of the aggregates was 120 micrometer. The aggregates were put in a rotary granulator, and an acetone solution with 20% by weight of polymethylmethacrylate was sprayed on the aggregates, and the aggregates were granulated again. The thus granulated substances were sorted according to a particle diameter in a range of not less than 650 micrometer nor more than 1.18 mm, and aggregates having an average particle diameter of 990 micrometer were obtained.

(Primary Aggregate 4)

100 parts by weight of phenyltriethoxysilane was dissolved in 3000 ml of water and 10 parts by weight of acetic acid, and 1500 parts by weight of magnetite particles having an average particle diameter of 2000 nm were dissolved. The thus obtained solution was sprayed by a mini spray dryer (manufactured by SHIBATA SCIENTIFIC TECHNOLOGY LTD., B-290 type), so that aggregates having an average secondary particle diameter of 40 micrometer, which contain magnetic substances aggregated spherically, were produced.

(Primary Aggregate 5)

$Fe_2O_3$ was weighed to be 49 mol %, ZnO was weighed to be 27 mol %, CuO was weighed to be 11 mol %, and NiO was weighed to be 13 mol %, and they were mixed in a ball mill, and then were fired temporarily at 700 degree Celsius. Thereafter, powders obtained after the temporary burning were wet-ground in a ball mill, so that particles having an average particle diameter of 3 micrometer were obtained. A solution obtained by mixing 3 parts by weight of polyvinyl alcohol and 2500 parts by weight of water was sprayed on 200 parts by weight of the above particles by an atomizer-type spray dryer to produce primary aggregates each having a particle diameter of 100 micrometer, which contain magnetic substances aggregated spherically. The above primary aggregates were fired at 900 degree Celsius for a short period of time, so that spherical primary aggregates each having a porous structure were produced.

The average pore diameter of these aggregates was measured by a shimadzu pore distribution measurement apparatus Autopore 9520 type. A summary of the measurements is shown in Table 1.

TABLE 1

| PRIMARY AGGREGATE | AVERAGE AGGREGATE DIAMETER [μm] | AVERAGE PORE DIAMETER [μm] | SURFACE STRUCTURE |
|---|---|---|---|
| 1 | 60 | 0.15 | POLYMETHYL-METHACRYLATE |
| 2 | 10 | 0.012 | POLYMETHYL-METHACRYLATE |
| 3 | 990 | 0.95 | POLYMETHYL-METHACRYLATE |
| 4 | 40 | 0.11 | PHENYLTRIETH-OXYSILANE CONDENSATE |
| 5 | 100 | 0.2 | MAGNETIC SUBSTANCE |

Example 1

A suspension made of 10 g of the primary aggregates 1 and 100 cc of water was made. The suspension was filtered through a KIRIYAMA ROHTO (a filter paper: 60 mm, 5B)

maintained under a depressurized condition to form a secondary aggregate made of the deposited primary aggregates on the filter paper. Next, a simulated waste liquid containing 500 mg/L of polyethylene glycol monolaurate and 1000 mg/L of gear oil was prepared, and 1 L of the simulated waste liquid was passed through the secondary aggregate under the depressurized condition. Since the passed liquid bubbled, it was confirmed that the surface active agent and the oil are separated and only the oil is removed. Next, the filter paper having the secondary aggregate deposited thereon was taken out, and the secondary aggregate was put in a beaker and washed with 100 ml of hexane. Next, the primary aggregates were taken out of the hexane with a bar magnet. The primary aggregates were dried in a vacuum desiccator, and the adsorption of wastewater was performed again with the primary aggregates. As a result, it was visually confirmed that the oil is removed.

Example 2 to 5

An adsorption test was conducted in the same manner as Example 1 except that in place of the primary aggregates 1, the primary aggregates 2 to 5 were used. Examples 2 to 5 are summarized in Table 2 together with Example 1. It was found out that the gear oil in the water can be removed when these primary aggregates are used.

Comparative Example 1

An adsorption test was conducted in the same manner as Example 1 except that not the aggregates but magnetite particles having an average particle diameter of 2000 nm were used. The simulated waste liquid was passed through the magnetite particles. When 500 ml of the simulated waste liquid was passed through the magnetite particles, there was little amount of the simulated waste liquid passing through the magnetite particles, and it was found out that the magnetite particles are clogged.

Example 6

A simulated waste liquid containing 500 mg/L of polyethylene glycol monolaurate and 1000 mg/L of gear oil was prepared, and 100 cc of the simulated wastewater and 10 g of the primary aggregates 1 were mixed and thereby a suspension. The suspension was filtered through a KIRIYAMA ROHTO (a filter paper: 60 mm, 5B) maintained under the depressurized condition to form a secondary aggregate made of the deposited primary aggregates on the filter paper, and the simulated waste liquid was passed through the secondary aggregate. Since the passed liquid bubbled, it was confirmed that the surface active agent and the oil are separated and only the oil is removed.

Next, the filter paper having the above aggregate deposited thereon was taken out, and the aggregate was put in a beaker and was washed with 100 ml of hexane. Next, the aggregates were taken out of the hexane with a bar magnet. The aggregates were dried in a vacuum desiccator, and the adsorption of wastewater was performed again with the aggregates. As a result, it was visually confirmed that the oil is removed.

TABLE 2

| | AGGREGATE | STACK METHOD | OIL REMOVAL | NOTE |
|---|---|---|---|---|
| EXAMPLE 1 | 1 | PRECOAT METHOD | POSSIBLE | |
| EXAMPLE 2 | 2 | PRECOAT METHOD | POSSIBLE | |
| EXAMPLE 3 | 3 | PRECOAT METHOD | POSSIBLE | |
| EXAMPLE 4 | 4 | PRECOAT METHOD | POSSIBLE | |
| EXAMPLE 5 | 5 | PRECOAT METHOD | POSSIBLE | |
| COMPARATIVE EXAMPLE 1 | (MAGNETITE SIMPLE SUBSTANCE) | PRECOAT METHOD | IMPOSSIBLE | CLOGGED IN THE MIDDLE |
| EXAMPLE 6 | 1 | BODY FEED METHOD | POSSIBLE | |

In the foregoing, while certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A wastewater treatment method, comprising:
mixing primary aggregates and a dispersion medium to make a suspension, the primary aggregates comprising a magnetic substance, a binder resin connecting the magnetic substance, and pores among the magnetic substance, the pores having openings on a surface of the primary aggregate;
passing the suspension through a filter to allow the primary aggregates to remain on the filter and to form a secondary aggregate comprising the primary aggregates and gaps among the primary aggregates;
passing wastewater through the secondary aggregate to remove suspended solids and emulsified oil in the wastewater by adsorbing the suspended solids on surfaces of the primary aggregates and by adsorbing the emulsified oil into the pores;
dispersing the secondary aggregate in a dispersion medium to decompose the secondary aggregate into the primary aggregates and to wash the primary aggregates; and collecting the primary aggregates with magnetic separation, wherein an average diameter of the primary aggregates is not less than 10 micrometer and not more than 1 mm, an average diameter of the pores is not less than 0.01 micrometer and not more than 1 micrometer, and an average diameter of the gaps is not less than 0.05 micrometer and not more than 10 micrometer, and wherein the binder resin contains at least one resin selected from a group consisting of a styrene resin, a hydrogenated styrene resin, a butadiene resin, an isoprene resin, an acrylonitrile resin, a cycloolefin resin, an alkylacrylate resin, a phenolic resin, and an alkylmethaacrylate resin.

2. The wastewater treatment method according to claim 1, wherein the dispersion medium is at least one of water and the wastewater.

3. The wastewater treatment method according to claim 1, wherein the magnetic substance and binder resin are mixed in a solution then subsequently sprayed and dried to form the primary aggregates.

4. The wastewater treatment method according to claim 1, wherein the magnetic substance is at least one selected from the group consisting of iron, alloy containing iron, magnetic iron ore, ilmenite, pyrrhotite, magnesia ferrite, cobalt ferrite, nickel ferrite, and barium ferrite.

5. The wastewater treatment method according to claim 1, wherein the magnetic substance is magnetite ($Fe_3O_4$).

6. The wastewater treatment method according to claim 1, wherein the magnetic substance is plated with Cu or Ni.

7. The wastewater treatment method according to claim 1, wherein a concentration of primary aggregates in the suspension is from 10000 to 200000 mg/L based on the total amount of the dispersion medium.

8. The wastewater treatment method according to claim 1, wherein a thickness of the secondary aggregate is from 1 to 100 mm.

* * * * *